United States Patent
Ton et al.

(10) Patent No.: US 6,745,012 B1
(45) Date of Patent: Jun. 1, 2004

(54) ADAPTIVE DATA COMPRESSION IN A WIRELESS TELECOMMUNICATIONS SYSTEM

(75) Inventors: Bobby That Dao Ton, Lachine (CA); Guy Côté, Montreal-Nord (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 557 days.

(21) Appl. No.: 09/716,171

(22) Filed: Nov. 17, 2000

(51) Int. Cl.[7] .............................................. H04B 17/00
(52) U.S. Cl. ...................................... 455/67.13; 455/72
(58) Field of Search .............................. 455/423–425, 455/501, 504, 506, 65, 63.1, 67.11, 67.13, 68, 69, 72; 375/225, 227; 704/221–228

(56) References Cited

U.S. PATENT DOCUMENTS

| | | | | |
|---|---|---|---|---|
| 5,546,395 A | * | 8/1996 | Sharma et al. .............. 370/468 |
| 5,649,299 A | * | 7/1997 | Battin et al. .................. 455/62 |
| 5,742,734 A | * | 4/1998 | DeJaco et al. ............... 704/226 |
| 5,784,406 A | * | 7/1998 | DeJaco et al. ............... 375/224 |
| 5,812,968 A | * | 9/1998 | Hassan et al. ............... 704/221 |
| 6,108,372 A | * | 8/2000 | Tiedemann, Jr. et al. ... 375/225 |
| 6,137,789 A | * | 10/2000 | Honksalo .................... 370/342 |
| 6,324,503 B1 | * | 11/2001 | Manjunath et al. ......... 704/226 |
| 6,397,177 B1 | * | 5/2002 | Isabelle ....................... 704/221 |
| 6,477,502 B1 | * | 11/2002 | Ananthpadmanabhan et al. ........................... 704/503 |
| 6,510,142 B1 | * | 1/2003 | Kinnavy et al. ............. 370/311 |

FOREIGN PATENT DOCUMENTS

WO    WO 97/48212    12/1997

* cited by examiner

*Primary Examiner*—Charles R. Craver
(74) *Attorney, Agent, or Firm*—Sandra Beauchesne; Jenkens & Gilchrist

(57) ABSTRACT

A method and system for performing adaptive compression in a wireless communication network includes monitoring a link quality of a signal transmitted via an air interface using, for example, a telecommunications node. Next, it is determined whether the link quality deteriorates below a first link quality threshold. A compressor associated with the transmitted signal is disabled in response to a determination that the link quality has deteriorated below the first link quality threshold.

21 Claims, 3 Drawing Sheets

ADAPTIVE DATA COMPRESSION IN A WIRELESS TELECOMMUNICATIONS SYSTEM

BACKGROUND OF THE INVENTION

1. Technical Field of the Invention

The present invention is directed in general to data compression in a mobile telecommunications system, and in particular to adapting compression for efficiently transporting data in a mobile telecommunication network.

2. Description of Related Art

Standardized compression schemes are currently available for use in fixed telecommunications networks. Such schemes allow for a more efficient transport of data by the fixed networks. By using header and/or data compression, the same or similar schemes could also be used to reduce packet size in wireless telecommunication networks and to efficiently and economically transport data over the air interface, the core network, and an external IP network.

In the wireless context, however, the use of compression introduces a number of problems. First, compression schemes require high processing power, while it is typically desirable to reduce the amount of resources used in a wireless telecommunications system. For example, mobile stations generally have a limited power supply, and it is therefore beneficial to reduce the amount of power used by the processor in the mobile station.

Another problem with the use of compression in the wireless context is caused by fluctuations in bit error rates. Fixed networks generally have a low and relatively constant bit error rate. Wireless networks, on the other hand, often have a higher and much more variable bit error rate caused by the combination of mobile station mobility and the use of an air interface as a transmission medium. As a result, when the wireless quality deteriorates (i.e., a high bit error rate exists), some data packets may be lost, thereby causing decompression on the receiving end to fail to regenerate the packet data. Such a situation causes an inefficient use of processing power because data packets are being compressed on the transmitting end, even though the data packets cannot be regenerated.

There is a need, therefore, for a system and method of efficiently and effectively compressing data in a wireless telecommunication network. Preferably, such a system and method would achieve a substantially optimal balance between compression and successful data recovery. In addition, such a system and method would preferably minimize inefficient uses of processing power and memory.

SUMMARY OF THE INVENTION

The present invention comprises a method and system for performing adaptive compression in a wireless communication network. In accordance with the invention, a link quality of a signal transmitted via an air interface is monitored, and it is determined whether the link quality deteriorates below a first link quality threshold. A compressor associated with the transmitted signal is disabled in response to a determination that the link quality has deteriorated below the first link quality threshold.

In another embodiment of the invention, a mobile telecommunications system includes a compressor for compressing at least a portion of a data packet to be transmitted via an air interface. In addition, the system includes a telecommunications node for monitoring a link quality of signals transmitted between a mobile station and a radio access network and a processor for controlling the compressor and disabling compression when the monitored link quality deteriorates below a preselected disable threshold.

In yet another embodiment, the invention comprises a mobile station for use in a wireless telecommunication network. The mobile station includes a compressor for compressing at least a portion of a data packet to be transmitted and a processor for controlling the compressor. The processor disables the compressor in response to a determination that a signal quality of a signal received by the mobile station is below a selected disable threshold.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

In connection with new wireless data communication systems, it is possible to incorporate data compression schemes, such as DEFLATE, STAC, or MPPC and header compression schemes, such as Van Jacobson or CRTP. Implementation of a data compression scheme, however, uses extensive processing resources. If the data compression does not work, then resources are essentially being wasted. For example, when the bit error rate in a wireless telecommunication network increases, it is likely that transmitted data will not be decompressed correctly on the receiving end of the air interface. In such a situation, the decompressor typically detects that the received packets cannot be properly decompressed and requests that the data be resent. In addition, the decompressor begins discarding received packets until the decompressor is able to resynchronize with the compression scheme. In the meantime, however, the compressor makes inefficient use of processing resources and bandwidth by trying to compress the data packets and send them over the air interface link, even though the data packets are simply being discarded by the decompressor.

In accordance with the present invention, however, the compressor is disabled for a certain amount of time whenever the wireless link quality deteriorates below a certain threshold. The compressor can then be reenabled when the air link quality improves. By disabling the compressor, unnecessary usage of the central processing unit (CPU) is eliminated. In addition, instead of discarding data packets once an erroneous packet is received, the decompressor continues to forward all received packets, which allows the non-compressed data packets to be recovered once the compressor is disabled.

Figure 1:
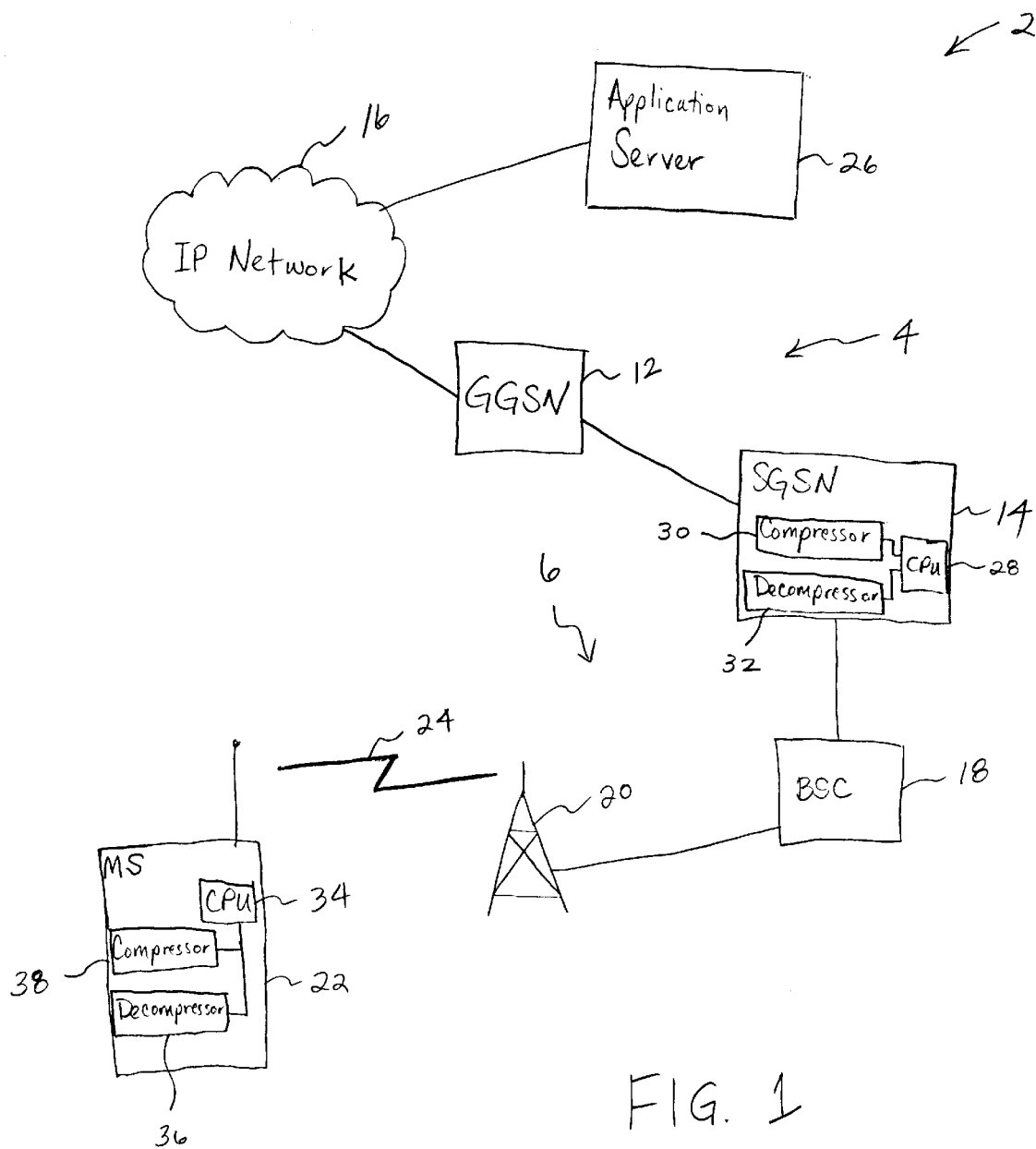
FIG. 1 illustrates a block diagram of a mobile telecommunications network.

Reference is now made to the drawings wherein like reference characters denote like or similar parts throughout the various figures. Referring now to FIG. 1, there is illustrated a block diagram of a mobile telecommunications network 2 in which the present invention can be implemented. In this example, the network 2 includes a general packet radio service (GPRS) subnetwork 4, which includes a gateway GPRS support node (GGSN) 12 and a serving GPRS support node (SGSN) 14. The GGSN 12 serves as an interface with an external IP network 16, while the SGSN 14 supports GPRS communications and routes packet data traffic in a geographical service area served by that SGSN 14. Although only one SGSN 14 is depicted, it will be understood by those of ordinary skill in the art that the GPRS subnetwork 4 typically includes a number of SGSNs 14. Furthermore, although a GPRS network is used as an example for purposes of describing and illustrating the invention in connection with a mobile telecommunication network, it will be understood that the invention can also be implemented in connection with any packet data technology used in the telecommunication network, such as UMTS, WCDMA, or CDMA2000.

The mobile telecommunications network 2 also includes a radio access network 6, which comprises a base station controller (BSC) 18. The base station controller 18 controls a plurality of subordinate base stations 20. Again, although only one base station controller 18 and base station 20 are shown in the figure, it will be understood that the radio access network 60 typically includes multiple base stations 20 and can include more than one base station controller 18. Each base station 20 serves a particular cell and communicates with mobile stations (MS) 22 in that cell via an air interface 24.

In operation, data packets are sent by an application server 26 via the IP network 16 to the GGSN 12. The GGSN 12 forwards the data packets to the SGSN 14, which includes a CPU 28 that controls a compressor 30. Using the compressor 30, data packets can be compressed such that they require less bandwidth or such that more data can be transmitted within the same amount of bandwidth. Although the compressor 30 is shown and described as being part of the SGSN 14, it will be appreciated that the compressor functionality can be implemented in almost any node within the mobile telecommunications system 2, including the base station controller 18, the GGSN 12, the IP network 16, or the application server 26.

Once the data packets are compressed, they are typically processed according to applicable air interface transmission protocols, which may involve channel encoding, interleaving, multiplexing, and modulating the data packets. Generally, these subsequent functions are performed by the base station controller 18 or the base station 20. The compressed data packets are then transmitted by the base station 20 via the air interface 24 to the mobile station 22. The mobile station 22 serves to recover the data packets by first processing the received information according to the air interface protocol, which will typically include demodulating, demultiplexing, deinterleaving, and channel decoding the data packets. Subsequently, a decompressor 36 that is controlled by a CPU 34 in the mobile station 22 decompresses the data packets using the same compression scheme used by the compressor 30.

In a similar manner, data packets to be sent by the mobile station 22 are compressed by a compressor 38 under the control of the CPU 34 and then transmitted via the air interface 24 to the base station 20. The base station 20 forwards the data packets via the base station controller 18 to the SGSN 14. A decompressor 32 in the SGSN 14 decompresses the data packets before they are sent to the GGSN 12 for transmission via the IP network 16. As with the compressor 30, the decompressor 32 can be located in virtually any node in the mobile telecommunications system 2.

In accordance with the present invention, the system 2 is able to quickly adapt to changes in the wireless link quality by allowing the CPUs 28 and 34 to disable and reenable the corresponding compressors 30 and 38 based on link quality statistics that are already typically gathered by the mobile station 22 or by the radio access network 6. Disabling the compressors 30 and 38 conserves system resources by reducing CPU usage. In a preferred embodiment, each of the decompressors 32 and 36, however, are always enabled. Thus, if received data is not compressed, the applicable CPU 28 or 34 simply does not call the decompressor function 32 or 36.

Preferably, the mobile station 22 and the SGSN 14 are each responsible for disabling and reenabling their respective compressor mechanism 30 and 38 based on the wireless link quality. In particular, when the mobile station 22 detects that the wireless link quality of downlink signals is degrading and has reached a lower (or disable) threshold, the CPU 34 disables the corresponding compressor 38. The wireless link quality is based, for example, on bit error rate (BER) measurements made by the mobile station 22. Subsequently, when the mobile station 22 detects that the wireless link quality is acceptable for using compression (i.e., the link quality of received downlink signals reaches an upper (or reenable) threshold), the CPU 34 reenables the compressor 38. Alternatively, the disabling and reenabling of the mobile station compressor 38 can be controlled by the radio access network 6 based on link quality statistics collected by either the mobile station 22 or by the radio access network 6.

In the downlink direction, when the radio access network 6 detects that the wireless link quality is degrading and has reached a lower (or disable) threshold, it sends an indication to the SGSN 14 to disable the compressor 30 for the specific mobile station 22. Thereafter, when the radio access network 6 detects that the wireless link quality is once again acceptable (i.e., the link quality reaches an upper (or reenable) threshold), the radio access network 6 sends an indication to the SGSN 14 to reenable the compressor 30 for the specific mobile station 22. In both the uplink and downlink directions, although the lower threshold and the upper threshold can be identical, the upper threshold is preferably higher than the lower threshold to prevent oscillations between disabling and reenabling the compressor mechanism when the wireless link quality is at or near the threshold value.

Also in accordance with the present invention, the decompressor 32 or 36 does not discard data packets that are received after the wireless link quality reaches the lower threshold. Instead, the CPU 28 or 34 instructs the decompressor 32 or 36 to forward the received data packets for processing by an upper level protocol without trying to decompress them. Alternatively, the CPU 28 or 34 simply causes the received data packets to bypass the decompressor 32 or 36. In this manner, the receiving mobile station 22 or receiving SGSN 14 can continue to receive transmitted data once the compressor 30 or 38 on the transmitting side is disabled. By allowing the data to continue being received despite the inability to use compression, more efficient and reliable communications are obtained, especially in the case of packet data voice applications.

The present invention can also be combined with the handoff decision process. For example, in GPRS systems, the base station 20 knows when the link quality for a particular mobile station 22 is deteriorating. In such a case, the CPU 28 and/or 34 disables the compressor 30 and/or 38 in the SGSN 14 and/or mobile station 22 and requests a handoff of the mobile station 22 to a new base station 20. Until the mobile station 22 can be handed off to a base station 20 that provides a better link quality, the SGSN 14 and/or the mobile station 22 continue forwarding received data packets instead of discarding them in the decompressor 32 or 36. Alternatively, the threshold for disabling and reenabling the compressor 30 or 38 can be different than the threshold for handoff. Accordingly, compression might be disabled either prior to or after the time when it is determined that a handoff is necessary, depending on whether the disable compression threshold is higher or lower than the handoff threshold.

Figure 2:
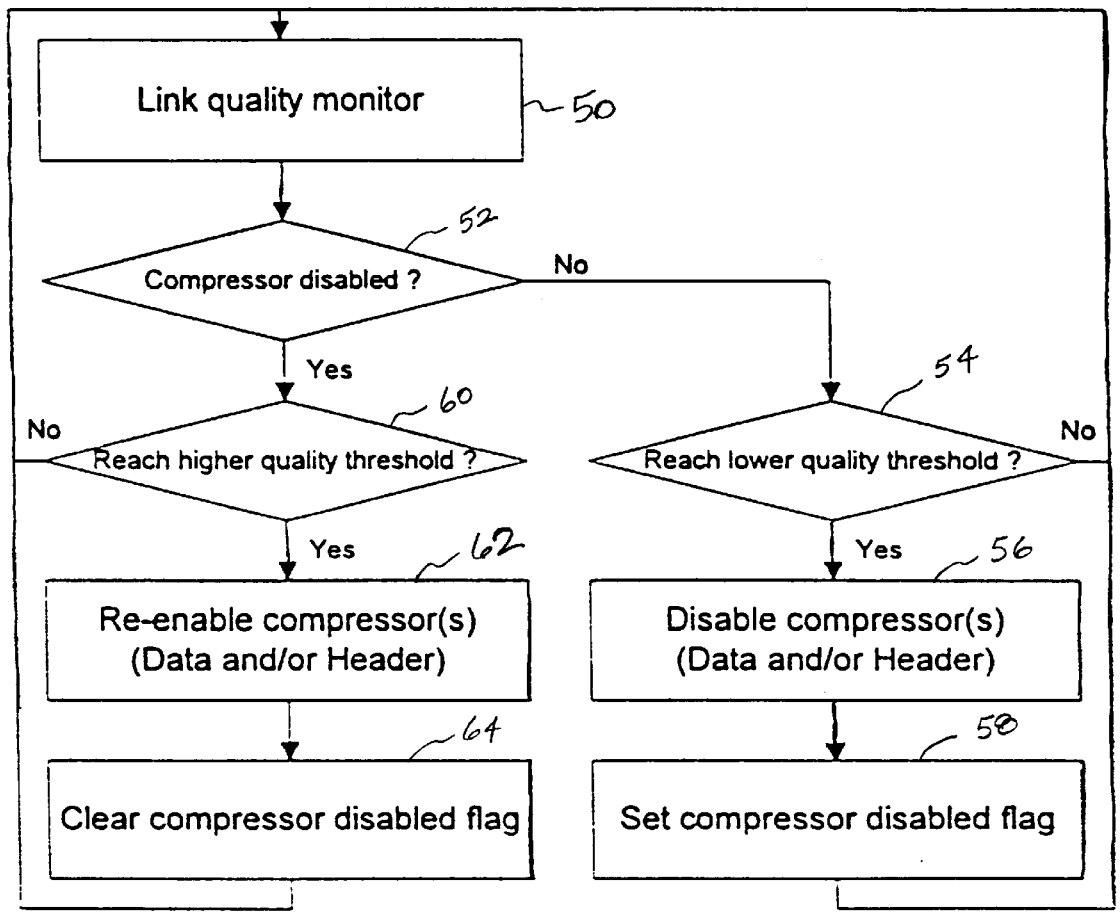
FIG. 2 illustrates a flow diagram of a process for disabling and reenabling the compression mechanisms in the mobile station in accordance with one embodiment of the present invention.

Referring now to FIG. 2, there is illustrated a flow diagram of a process for disabling and reenabling the compression mechanisms in the mobile station 22 in accordance with one embodiment of the present invention. At step 50 the mobile station 22 monitors the link quality of its current communication link. At step 52, it is determined whether the mobile station compressor 38 is currently disabled by examining the state of a compressor disabled flag. If the compressor 38 is not disabled, it is determined at step 54 whether the current link quality has reached a lower quality threshold at step 54. If the current link quality is above the lower quality threshold, the process returns to step 50 where the mobile station 22 continues to monitor the link quality of the communication link. On the other hand, if it is determined at step 54 that the current link quality has reached a lower quality threshold, the compressor 38 for the mobile station 22 is disabled at step 56. This disabling of the compressor 38 can involve disabling only data compression, only header compression, or both. Following the step of disabling the compressor 38, a compressor disabled flag is set at step 58 for determining whether the compressor 38 is disabled at step 52 in a subsequent iteration of the process.

Returning again to step 52, if it is determined that the compressor 38 is currently disabled, the process continues at step 60 where it is determined whether the current link quality has risen above a higher quality threshold. If not, the process returns to step 50 where the mobile station 22 continues to monitor the link quality of the communication link. If, however, the current link quality has reached the higher quality threshold, data and/or header compression is reenabled at step 62. Subsequently, the compressor disabled flag is cleared at step 64, and the process returns to step 50 where the mobile station 22 continues to monitor the link quality.

Figure 3:
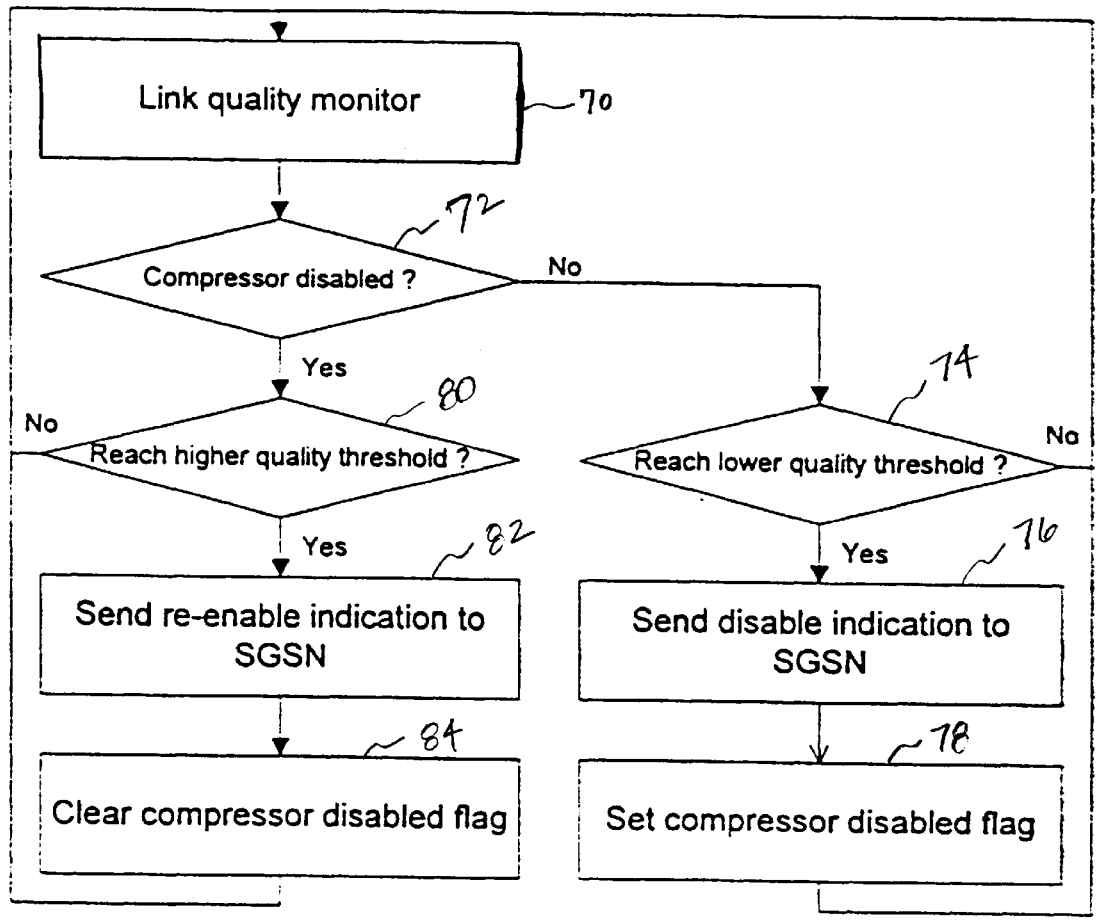
FIG. 3 depicts a flow diagram of a method for disabling and reenabling the compression mechanism on the system side of the communication link in accordance with one embodiment of the present invention.

Referring now to FIG. 3, there is illustrated a flow diagram of a method for disabling and reenabling the compression mechanism on the system side of the communication link in accordance with one embodiment of the present invention. At step 70, the base station controller 18 (or the base station 20) monitors the link quality of the uplink signal received from a particular mobile station 22. Next, at step 72, it is determined whether the compressor 30 in the SGSN 14, or at some other location within the system 2, is currently disabled. If not, it is next determined whether the link quality of the monitored uplink signal has reached a lower quality threshold at step 74. If the measured link quality is above the lower quality threshold, the process returns to step 70 where the link quality of the current uplink signal continues to be monitored. On the other hand, if the current link quality has reached the lower quality threshold, the base station controller 18 sends a disable compression indication to the SGSN 14 at step 76. In addition, a compressor disabled flag is set at step 78. The process then returns to step 70 where the base station controller 18 continues to monitor the link quality of the uplink signal received from the particular base station 22.

Returning to step 72, if it is determined that the compressor disabled flag is set, the process continues at step 80 where it is determined whether the current link quality of the uplink signal has reached a higher quality threshold. If not, the process returns to step 70 where the link quality continues to be monitored. If, however, the current link quality has reached the higher quality threshold, the base station controller 18 sends a reenable compression indication to the SGSN 14 at step 82. As a result, the compressor disabled flag is cleared at step 84, and the process returns to step 70 where the link quality continues to be monitored. Although various preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for performing adaptive compression in a wireless communication network, comprising the steps of:
   compressing a first of a plurality of data packets;
   monitoring a link quality of a signal comprising the first of the plurality of data packets transmitted via an air interface;
   determining whether the link quality deteriorates below a first link quality threshold, and determining whether a signal quality of the first data packet is below the first link quality threshold;
   disabling a compressor associated with the transmitted signal in response to a determination that the link quality has deteriorated below the first link quality threshold; and
   transmitting a second of the plurality of data packets without compressing the second data packet after the step of disabling the compressor.

2. The method of claim 1, wherein the data packets are transmitted using a general packet radio service.

3. The method of claim 1, wherein the step of monitoring the link quality comprises monitoring a bit error rate for at least one of the plurality of data packets.

4. The method of claim 1, wherein the transmitted signal comprises a downlink signal received by a mobile station, said mobile station including the compressor.

5. The method of claim 1, further comprising the step of utilizing at least one data packet without attempting to decompress the data packet after the step of disabling the compressor.

6. The method of claim 1, wherein the transmitted signal comprises an uplink signal received from a mobile station, and the compressor is located on a network side of the air interface.

7. The method of claim 1, further comprising the steps of:
   determining whether the link quality increases above a second link quality threshold; and
   reenabling the compressor in response to a determination that link quality has increased above the second link quality threshold.

8. The method of claim 7, wherein the second link quality threshold represents a better link quality than the first link quality.

9. A mobile telecommunications system, comprising:
- a compressor for compressing at least a portion of a data packet to be transmitted via an air interface;
- a telecommunications node for monitoring a link quality of signals transmitted between a mobile station and a radio access network;
- a processor for controlling the compressor and disabling compression when the monitored link quality deteriorates below a preselected disable threshold; and
- a base station for transmitting a plurality of data packets via the air interface, said base station transmitting compressed data packets received from the compressor and transmitting non-compressed data packets via the air interface when compression is disabled.

10. The system of claim 9, further comprising a general packet radio service (GPRS) network for transporting the data packet.

11. The system of claim 10, wherein the GPRS network comprises a serving GPRS support node (SGSN) that includes the compressor and the processor.

12. The system of claim 10, wherein the GPRS network comprises a gateway GPRS support node (GGSN) that includes the compressor and the processor.

13. The system of claim 9, wherein the radio access network includes the telecommunications node.

14. The system of claim 13, wherein the telecommunications node comprises a base station controller.

15. The system of claim 9, further comprising a decompressor for decompressing compressed data packets received via the air interface, said decompressor being controlled by the processor.

16. The system of claim 15, wherein the processor operates to forward certain data packets without attempting to decompress the certain data packets using the decompressor when a compressor for the mobile station from which the certain data packets are transmitted is disabled.

17. The system of claim 9, wherein the processor reenables compression when the monitored link quality increases above a preselected reenable threshold.

18. The system of claim 9, further comprising a mobile station that includes the compressor and the processor, said mobile station receiving instructions from the telecommunications node to disable compression.

19. A mobile station for use in a wireless telecommunications network, comprising:
- a compressor for compressing at least a portion of a data packet to be transmitted; and
- a processor for controlling the compressor, said processor disabling the compressor in response to a determination that a signal quality of a signal received by the mobile station is below a selected disable threshold and transmitting a second of the plurality of data packets without compressing the second data packet after the step of disabling the compressor.

20. The mobile station of claim 19, wherein the processor reenables the compressor in response to a determination that a signal quality of a signal received by the mobile station is above a selected enable threshold.

21. The mobile station of claim 19, further comprising a decompressor for decompressing data packets received by the mobile station, wherein the processor operates to forward certain received data packets for processing in accordance with a higher level protocol when an attempt to decompress at least one of the certain received data packets fails.

* * * * *